No. 883,014. PATENTED MAR. 24, 1908.
W. B. HAMPTON.
PLANTER.
APPLICATION FILED JULY 2, 1907.
4 SHEETS—SHEET 4.
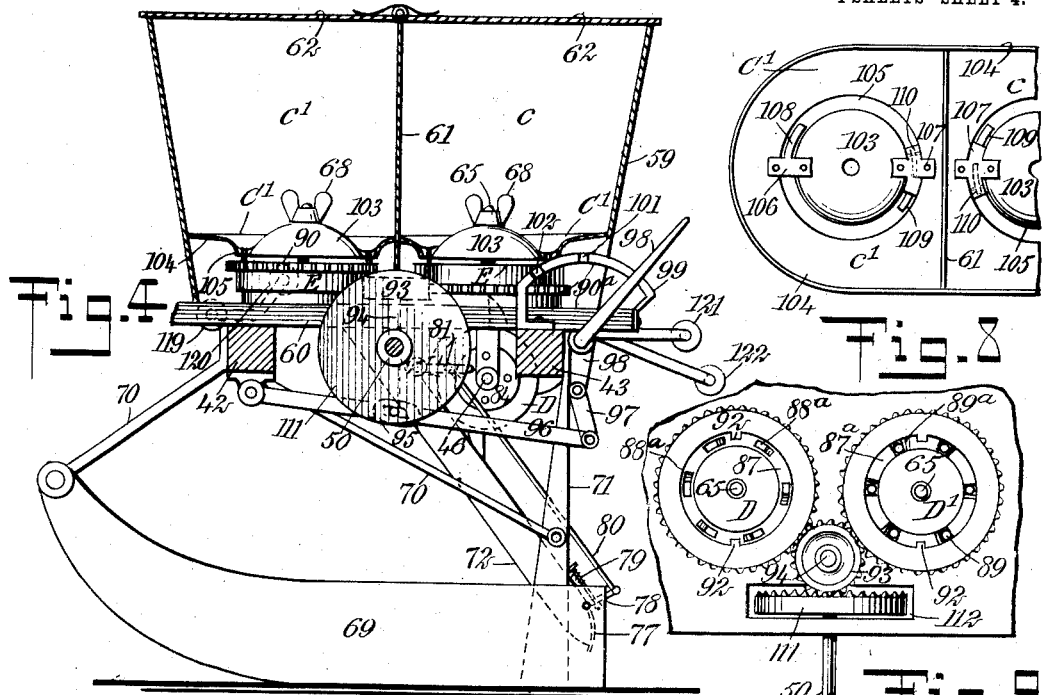
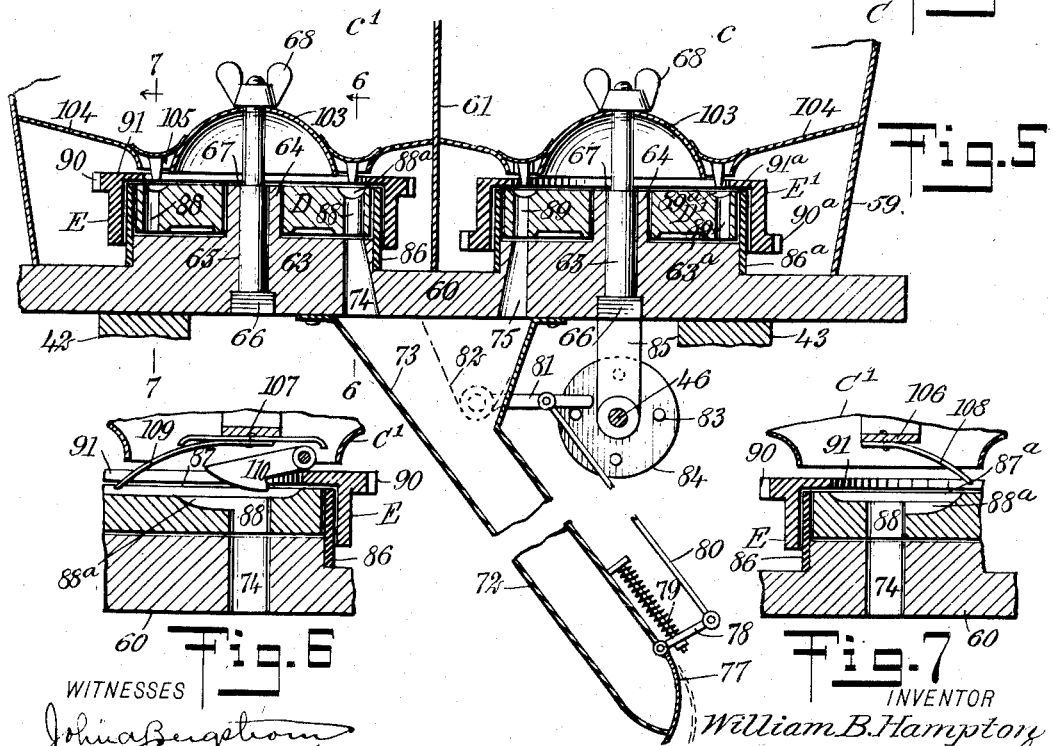
WITNESSES
INVENTOR
William B. Hampton
BY Munn & Co.
ATTORNEYS

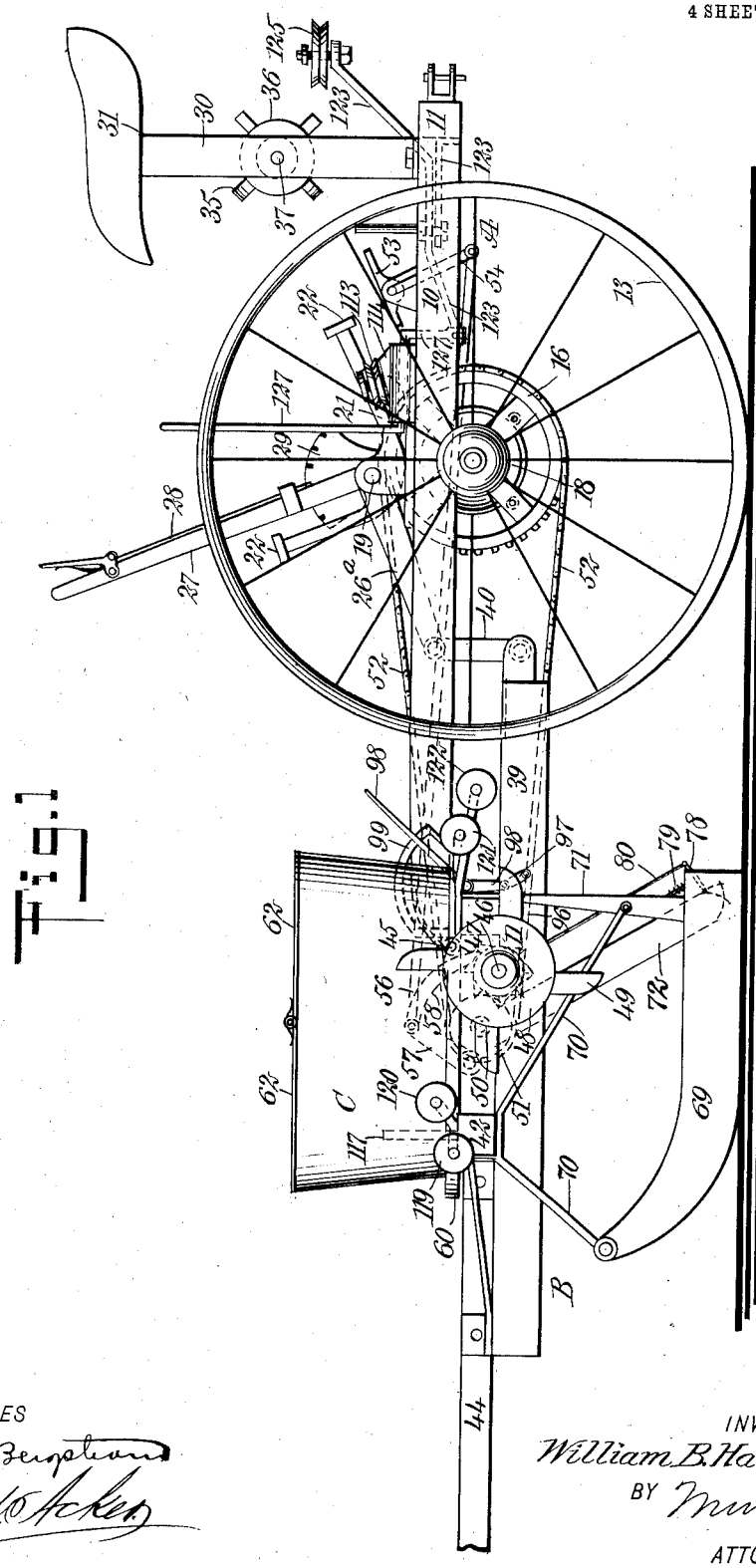

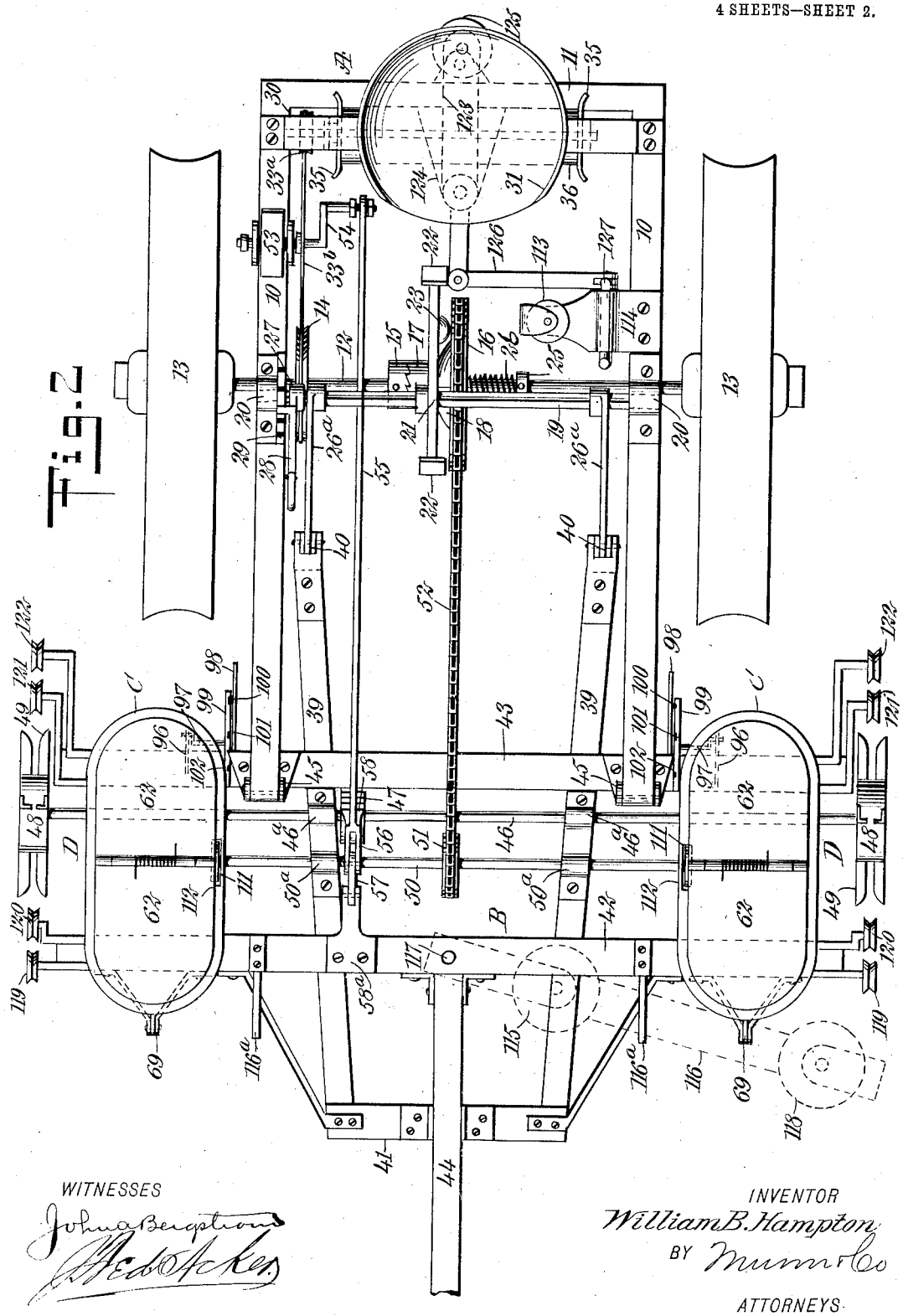

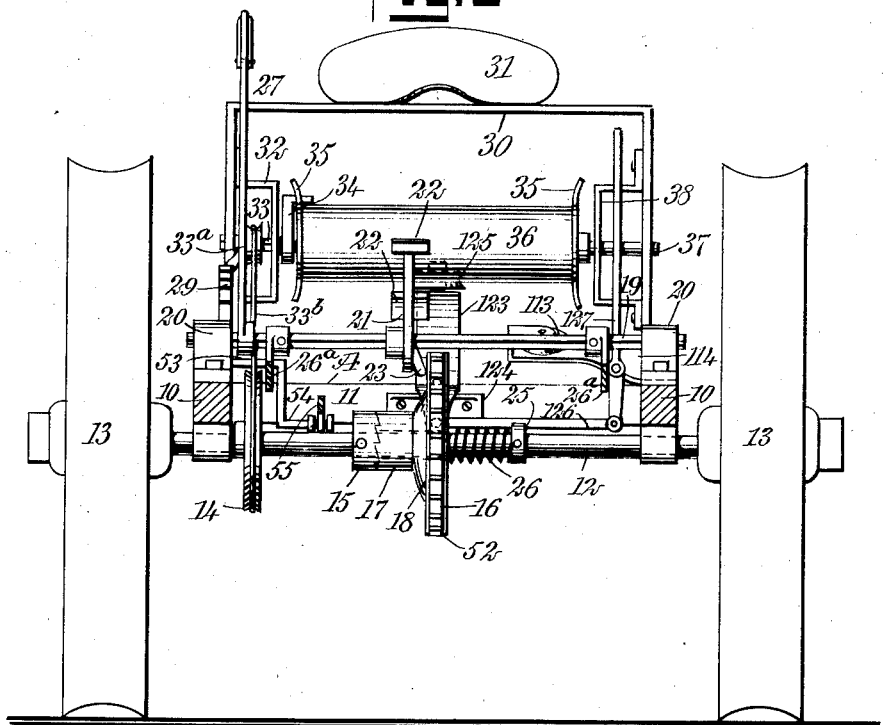

UNITED STATES PATENT OFFICE.

WILLIAM B. HAMPTON, OF FREMONT, MISSOURI.

PLANTER.

No. 883,014.   Specification of Letters Patent.   Patented March 24, 1908.

Application filed July 2, 1907. Serial No. 381,830.

*To all whom it may concern:*

Be it known that I, WILLIAM B. HAMPTON, a citizen of the United States, and a resident of Fremont, in the county of Carter and State of Missouri, have invented a new and useful Improvement in Planters, of which the following is a full, clear, and exact description.

The purpose of the invention is to provide a planter exceedingly simple, light and durable in construction, and adapted for the planting of corn and peas, both characters of seed being dropped from the same seed box, the box being divided and arranged to that end; that is to say, by the manipulation of a lever located at the seed box, which when moved in one direction will cause the machine to plant corn only, when moved to another position the machine will plant both corn and peas, and further, when the lever is carried to a third position only peas will be planted, and since a seed box of the character described is located at each side of the frame of the machine, the operator is enabled to plant one row of corn and one row of peas, or plant corn and peas in both rows at the same time, or plant corn or peas in any manner desired, in either check row or drill.

Another purpose of the invention is to provide guides for the check row wire which will enable the machine to be completely controlled thereby, or when the check row wire is rendered inactive the dropping of the seed will be under the absolute control of the operator and also while the check row wire is in action; and it is a further purpose of the invention to so construct the machine that it will perfectly check row or drill such small seed as broom corn, cane, etc.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a side elevation of the machine; Fig. 2 is a plan view thereof; Fig. 3 is a transverse section taken just in front of the axle looking to the rear; Fig. 4 is a vertical section through the inner side portion of a seed drop box and a longitudinal section through the frame at said point, illustrating the driving mechanism for the seed drop box and the lever for controlling the character of the seed to be dropped, the view being drawn upon an enlarged scale; Fig. 5 is a central longitudinal section through the bed section of a seed drop box, also drawn upon an enlarged scale; Fig. 6 is a vertical transverse section taken practically on the line 6—6 of Fig. 5; Fig. 7 is a similar section taken substantially on the line 7—7 of Fig. 5; Fig. 8 is a plan view of a portion of one of the seed boxes with the inner covers in place; Fig. 9 is a plan view of a portion of a seed drop box, the covers being removed; Fig. 10 is a sectional side elevation of the base or bottom of a seed drop box, illustrating the direct driving mechanism for the seed drop disks and the controlling lever for said disks; and Fig. 11 is a detail section taken practically on the line 11—11 of Fig. 10.

The frame of the machine is in two sections, namely, a rear section A and a forward section B. The rear section A consists of parallel side pieces 10 connected at their rear ends by a cross bar 11. This frame A is suitably mounted upon an axle 12 that extends beyond the sides of the frame, and on the outer ends of the said axle supporting wheels 13 are secured. A grooved pulley 14 is secured to the axle 12 within the frame near the right-hand end of the axle, and at about the center of the axle a clutch 15 is secured thereto, and opposite this clutch a driving sprocket wheel 16 is loosely mounted on the axle 12, to be capable of sliding to and from the clutch 15, and the hub 17 of the driving sprocket wheel 16 is provided with a clutch face adapted for engagement with the aforesaid clutch 15, as is shown in Fig. 2, and upon that face of the driving sprocket wheel 16 which is opposite the clutch 15, a semi-spherical projection 18 is formed.

Above the axle 12 a shaft 19 is journaled in suitable bearings 20, located on the sides of the frame A, as is also best shown in Fig. 2, and between the ends of the shaft 19 an angular foot lever 21 is secured, having foot rests 22 at the outer ends of its members, as is illustrated in both Figs. 1 and 2, and the rearwardly extending member of the lever 21 is provided with a projection 23, adapted when the said member is pressed downward to engage with the projection 18 of the face of the driving sprocket wheel 16, to force the driving sprocket wheel out of engagement with the clutch 15, so that the axle may then turn without turning the driving sprocket wheel. The said driving sprocket wheel 16 is normally forced in direction of the clutch 15 by means of a spring 26, that is coiled around the axle 12, having bearing at its outer end against a collar 25 secured to said axle, as is shown in Fig. 2. The shaft 19 is provided within the frame adjacent each end with a forwardly extending crank arm 26ª, and a lever 27 is secured to the said shaft 19 at its right-hand end so as to turn the shaft by the movement of the said lever, and the lever 27 is provided with a thumb latch 28 that engages a notched segment 29 extending up from the right-hand side member 10 of the rear frame A.

An upwardly extending yoke 30 is located at the rear portion of the said frame A, and on the upper portion of the said yoke the driver's seat 31 is secured so that the members of the foot lever 21 are within convenient reach of the feet of the driver. When the foot lever 21 is operated, the thumb latch of the hand lever 27 is released from the segment 29, being permitted to engage again with the said segment after the necessary movement on the part of the foot lever is accomplished. A bracket 32 is secured to the right-hand upright member of the yoke 30, as is shown in Fig. 3, and a short shaft 33 is journaled in the said member and in the said bracket and on this shaft within the bracket a small pulley 33ª is secured, connected by a belt 33ᵇ with the grooved pulley 14 on the axle 12, and at the inner end portion of the shaft 33 a crank arm 34 is secured, the outer member whereof is adapted to engage with the right-hand spider-like head 35 of a drum 36 on which the check row wire is wound. This drum 36 is provided with an aperture at each end, the aperture at the right hand end loosely receiving the inner end portion of the short shaft 33, while the aperture at the left-hand end loosely receives an opposing shaft 37, that is passed through the other member of the yoke 30 and likewise through a bracket 38 secured to said member, as is illustrated in Fig. 3. It will thus be observed that the drum is driven by the rotation of the axle 12.

The forward frame B comprises two side members 39, that diverge at their rear ends, and the rear end portions of the said side members 39 have pivotal connection with the crank arms 26ª extending from the shaft 19 through the medium of links 40, or their equivalents. A cross bar 41 connects the forward ends of the side members 39, and transverse bars 42 and 43 suitably spaced, are made to cross the side members 39 of the said forward frame B and to extend to a point beyond the outer faces of the supporting wheels 13. A tongue or pole 44 is secured to the forward transverse bar 42 and to the front connecting bar 41, as is illustrated in Fig. 2. A hinge connection 45 is provided between the forward ends of the side members of the rear frame A and the rear cross bar 43 of the forward frame B, so that by operating the hand lever 27 the forward frame B may be raised and lowered, and when the said forward frame is raised, the foot lever 21 will have been turned so as to bring its projection 23 in contact with the projection 18 from the driving sprocket wheel 16, to render the latter loose upon the axle 12.

A driving shaft 50 for the seed drop mechanism contained in the seed boxes C, is journaled in suitable bearings 50ª located respectively on the side members 39 of the forward frame B between the front and rear cross bars 42 and 43, as is illustrated in Fig. 2. The seed boxes C are located one at each side of the machine and are supported by the projecting sections of the aforesaid cross bars 42 and 43, as is also shown in Fig. 2. A sprocket wheel 51 is secured to the said driving shaft 50, and the sprocket wheel 51 is connected with the driving sprocket wheel 16 by a chain belt 52. Slightly at the rear of the drive shaft 50 and also between the transverse bars 42 and 43, a check row shaft 46 is journaled in suitable bearings 46ª, secured upon the side members 39 of the forward frame B, as is also shown in Fig. 2, and this check row shaft 46 has a ratchet wheel 47 secured thereto adjacent the right-hand side member 39 of the forward frame, and at each end of the shaft 46 a check row wheel or head D is secured to the shaft 46, and the said check row wheels each consist preferably of a hub 48 and spokes 49 that radiate in pairs from the said hub, the spokes being in the shape of angle irons but their outer ends at their inner edges are more or less inclined or convexed, as is shown in Fig. 2, for the ready reception of the check row wire and the customary projections thereon.

A foot lever 53 is pivotally mounted upon the right-hand side member 10 of the rear frame A adjacent the rear end of the said frame, occupying such position that the said lever 53 can be readily reached by the right foot of the driver, and this lever 53 is secured to and operates an inwardly extending crank shaft 54, the said crank shaft 54 being pivotally connected with one end of a shifting or connecting rod 55, which extends to a point over the drive shaft 50 and is provided with a fork 56 at its forward end, that receives the upper end of a link 57, pivotally attached to a bracket 58ª, extending rearward from the right-hand portion of the front transverse bar 42, as is illustrated in both Figs. 1 and 2, and at the fork 56 a dog 58 is pivoted to the connecting or shifting rod 55, which dog is adapted for engagement with the teeth of the ratchet wheel 47, so that by operating the foot lever 53 the check row shaft 46 may be turned at the will of the operator in order to correct inaccuracies in the dropping of the seed.

The seed boxes C are preferably of the oval formation illustrated but they may be otherwise shaped if desired, and each seed box consists of an upper shell 59 and a base 60. A partition 61 located centrally within the shell 59, divides the seed boxes into two compartments or chambers $c$ and $c'$, the compartment $c$ being adapted to receive peas or other small seed, while the compartment $c'$ is adapted to receive corn, and the seed box C is provided with a cover 62 for each of its compartments, the covers being by preference spring-controlled, as is illustrated in Figs. 2 and 4.

At the central portion of each compartment $c$ and $c'$ of the seed box a circular boss is formed, the boss in the compartment $c'$ being designated as 63 and that in the compartment $c$ as $63^a$, and each boss is provided with an upwardly extending central circular member 64, and a bolt 65 is passed through the bottom portion of each compartment into a hopper and through the upper central members of the boss 63 and $63^a$ to a point above said members 64, as is best shown in Fig. 5, and the upper portion of each bolt 65 is reduced in diameter so as to form an angular shoulder 67 flush with the upper edge of the member 64 of the boss through which the bolt is passed; the heads 66 of the bolts are suitably embedded in the under face of the bottom 60 of the seed box. The upper end of each bolt 65 is threaded to receive preferably a winged nut 68. A runner or furrow opener 69 is located beneath each seed box, the forward ends of the runners being upturned in the customary manner, as is shown in Figs. 1 and 4. These runners are supported by braces 70 attached to their forward ends and to the front cross bar 42 of the forward frame, the braces 70, the front ones being carried downward and forward from the said bar 42 and the rear ones from the said bar to an engagement with a wider brace 71 that extends down from the rear cross bar 43. The rear or heel end of each runner 69 is bifurcated and the lower end of each rear brace 71 for a runner is also forked for attachment to the bifurcated heel portions of the runners, since a seed delivery chute 72 is passed at its delivery end through the forked portion of the brace 71 for each runner and down into the bifurcated heel portion of the runner, as is shown also in Figs. 1 and 4.

The upper end-portions of these chutes 72 are widened so as to extend from the bottom of one compartment of a seed box to the corresponding portion of the bottom of the other compartment, as is shown in Fig. 5, in order that a seed discharge opening produced in the bottom of each compartment will lead into the top of the chute 72; these discharge openings are designated 74 and 75 and are best shown in Fig. 5. The discharge opening 74 for the corn compartment $c'$ extends from the bottom upward through the boss 63 in said compartment, and while its outer wall is straight its inner wall is downwardly and inwardly inclined, so as to render the lower end of the discharge opening as wide as possible for the escape of the seed. The discharge opening 75 for the peas compartment $c$ is of corresponding shape to the discharge opening 74, as is clearly shown in Fig. 5.

A gate 77 is provided at the lower end of the discharge chute 72, and the said gate is provided at its hinge connection with the chute with an outwardly extending arm 78, against which a spring 79 bears to normally keep the gate 77 closed. The gate 77 is to be opened at desired intervals either through the action of the check row wire employed or by the manual operation of the check row shaft 46. This opening action of the gate 77 is accomplished by pivoting a link 80 to the outer end of the arm 78, which link in its turn is attached to a trip arm 81 that extends out from a hanger 82 at one side of the chute 72, as is shown in Fig. 5, and this trip arm 81 is engaged laterally by pins or like projections 83 that extend from the face of a disk 84, which disk is secured to the check row shaft 46, as is also shown in Fig. 5, and the check row shaft is supported beneath the bottom portions of the seed boxes by suitable hangers 85.

A metal casing 86 is secured at the exterior portion of the boss 63 and a corresponding casing $86^a$ is correspondingly secured to the boss $63^a$ of the seed boxes. These casings 86 and $86^a$ are open at the top and extend upward to about a point in horizontal alinement with the central extension members 64 of the said boss, as is shown particularly in Fig. 5.

A seed drop disk D is mounted upon the boss 63 in the corn compartment $c'$, being adapted to turn around the upwardly extending member 64 of that boss, as is shown in Fig. 5, while a second seed drop disk D' is similarly mounted in the compartment $c$ upon the boss $63^a$. The lower central portions of these seed drop disks are chambered to a certain extent, as is shown in Fig. 5, so that they will move with the least possible amount of friction. The seed drop disk D is provided with an annular depression or groove 87 in its upper face at its peripheral portion, and the seed drop disk D' is provided with a similar depression or groove $87^a$, as is particularly shown in Fig. 9. In the grooved or depressed portion of the disk D a series of apertures 88 is formed, and these apertures constitute pockets each adapted to receive a single grain of corn, and at one end of each pocket the surface of the disk in which the pocket is made is provided with a downward inclination 88ª extending toward the center of the pocket, as is shown in Figs. 6, 7 and 9. These pockets 88 are shown of rectangular form and extend through the disk from top to bottom and are so placed that when the rotation of the disk D takes place they will be brought in registry one after the other with the discharge opening 74 in the bottom of the compartment c' for the discharge of the seed contained in the pocket.

With reference to the disk D', it is provided with a series of pockets 89 also located in the depressed portion of the disk, and these pockets 89 extend through from top to bottom of the disk and correspond in number and location to the pockets in the disk D, as is shown in Fig. 9, and each pocket 89 is provided with an inclined wall 89ª corresponding to the inclined wall 88ª for the pocket 88.

A ring gear E is mounted to turn freely around the casing 86 for the seed drop disk D in the corn compartment c'. This ring gear E is provided with teeth 90 at its upper peripheral portion and with an upper flange 91 that extends over the casing of each of the seed drop disks D and D', as is shown in Fig. 5, and a second ring gear E' is mounted to turn around the casing 86ª in the peas compartment c, as is also shown in Fig. 5, and this ring gear E' is provided with peripheral teeth 90ª at its lower exterior portion and with a flange 91ª at its upper portion corresponding to the flange 91 of the ring gear E. The ring gears are connected with the seed drop disks to which they belong in any suitable or approved manner, as for example, by forming tongues 92 in their flanges 91 and 91ª, which tongues enter recesses in the upper peripheral surface of the seed drop disks D and D', as is illustrated in Fig. 9.

In connection with the two ring gears E and E', I employ a shifting pinion 93 which is located between the two ring gears and is capable of meshing with the teeth of both, and the partition 61 is cut away to permit of the free movement of the said shifting pinion. This shifting pinion 93 is secured to the upper end of a shaft 94 mounted to turn in suitable bearings in the bottom of the seed box, as is shown in Figs. 10 and 11. The lower end of the shaft 94 is pivotally attached to an enlargement 95 between the ends of a lever 96 that is pivotally attached to the forward transverse bar 42 of the forward frame B. The rear end of the lever 96 is connected by a link 97 with a crank lever 98 and this lever has fulcrumed bearings carried by the rear transverse bar 43 of the front frame, being located at the inner side of the rear end portion of the bottom of the seed box, as is shown in Figs. 4 and 10. This lever 98 has movement along a rack 99 that is secured to the inner face of the bottom of the seed box and the said rack 99 is provided with three notches, a rear notch 100, a central notch 101 and a forward notch 102. When the lever 98 is in the rear notch 100 the shifting pinion 93 will have been carried up just a sufficient distance to engage with the teeth on the ring gear E' in the peas chamber, and will rotate that gear only and consequently peas will be the only seed supplied to the chute 72. When the lever 98 enters the central notch 101 the shifting pinion 93 will have been carried upward a sufficient distance to engage with both the ring gears E and E', rotating both of them and consequently operating both seed dropping disks in the seed boxes and causing the planting of both corn and peas. When the lever is carried forward and enters the forward notch 102, the shifting pinion 93 is brought in engagement only with the teeth 90 of the ring gear E and therefore only the corn dropping disk D will be brought into action.

A false bottom C' is provided for each compartment c and c'. These false bottoms are removable and each bottom consists of a central dome-like section 103 and an upwardly and outwardly inclined marginal section 104, the dome section being separated from the marginal section by an annular slot 105 of sufficient width only to permit the corn to drop down edgewise, and the slots 105 in the false bottoms C' are directly over the pockets in the seed drop disks covered by the said bottoms. The bottoms are held in place by frictional engagement or otherwise by the side walls of the compartments in which they may be placed and by means of the bolts 65 which pass through the dome sections and are held in position thereon by the nuts 68. The dome section and the marginal section of a false bottom C' are connected by opposing bridge brackets 106 and 107; one bridge bracket 106 of an opening 105 is provided, as is shown in Figs. 7 and 8, with a spring finger 108 that extends downward into the groove 87 or 87ª of a seed drop disk and serves to force the seed to one side so that the seed will not crowd in entering the pockets of the disks. The opposing bridge bracket 107 is provided with a spring finger 109 that likewise extends down into the annular groove 87 or 87ª of a seed drop disk to clear away any superfluity of grain, and to the rear of this clearing finger 109 a clearing dog 110 is pivoted beneath the bracket 107, as is particulary shown in Fig. 6 and this dog 110 will ride down the depressed walls of the pockets in the seed drop disks and will insure but one seed or the required number only, entering a compartment.

The shifting pinions 93 are operated by means of crown wheels 111 which extend up through openings 112 in the bottom of the seed boxes and engage with the pinions 90 and 90ª, as is shown best in Figs. 9 and 11, and these crown wheels 111 are secured upon the drive shaft 50.

The check row wire not shown is carried from the reel 36 over a guide pulley 113, supported by a bracket 114 attached to the left-hand side of the rear frame A, and from thence the check row wire is carried to a guide pulley 115, located at the inner end of a reversible guide arm 116, that is pivotally mounted on a pin 117 at the central portion of the forward transverse bar 42, and from the pulley 115 the check wire is passed over a second pulley 118, adjacent the outer end of the shifting guide arm 116, and from the pulley 118 the check row wire is carried to a stake in the field or to any convenient anchorage desired.

In winding up the check row wire on the reel 36 the wire is guided along the reel by means of an angular lever 123 located beneath the driver's seat, being pivotally attached to a bracket 124 extending from the rear end of the frame A, as is particularly shown in dotted lines in Fig. 2, and at the rear end of the lever 123 a horizontal guide pulley 125 is mounted which is at the rear of the reel 36 and a link 126 is pivotally and removably attached to the forward end of the lever 123 and to an angle hand lever 127 preferably fulcrumed on the aforesaid bracket 114. By means of the lever 127, the check row wire having been passed over the guide pulley 125, the wire is made in winding to travel from end to end of the reel or drum 36. When the lever 123 is not needed, the link 126 is disconnected therefrom and the said lever 123 is moved out of the way.

In the operation, the machine will plant and stretch the wire at the same time when it starts planting in the field. It will be observed that the shifting guide arm 116 may be carried to the left or to the right hand side of the machine, as may be required. When finishing a field, the guide arm 116 is removed from the front frame B and is placed on the bracket 124 over the lever 123, and on the same pin that holds the lever 123 in place at the rear of the frame A. The check row wire being stretched in front of the machine, it passes over the check row wheel, then to the rear of the machine and around the pulley 118 on the guide arm 116, then around a pulley 125 on the lever 123 and is attached to the rear wheel 36. While the machine is in motion, it winds up the wire, drawing it across the check row wheel, causing it to plant at the same time. The guide arm 116 is not used at any other time than at the first passage through a wheel and while placed on the front of the machine to stretch the wire across the field and plant at the same time. It is then turned out of the way during the rest of the planting, except the last trip through the field, when it is placed on the rear of the machine to guide the wire, while winding up the wire and planting the last row before driving from the field. By the use of this guide arm, no time or labor will be lost in stretching or in taking up the check row wire; the planter will do it all while planting.

Having thus described my invention, I claim as new and desire to secure by Letters Patent,—

1. In a planter, a seed box having separate compartments therein, a discharge opening for each compartment, a seed discharge chute receiving material from each of said openings, a seed drop disk in each compartment, a gear controlling the movement of each of the disks, a driving pinion for the gears, and means for shifting said pinion for engagement with either or both of said disk gears.

2. In a planter, a seed drop box divided into separate compartments, each compartment having separate seed discharge openings, a seed delivery chute common to both of said openings in each compartment, the pockets whereof are adapted to successively register with the discharge openings, and means adjustable to either or simultaneously to both of the seed disks, to revolve the same.

3. In a planter, a seed drop box divided into compartments, each compartment having a separate seed delivery opening, a seed delivery chute common to both of said openings, a rotatable seed drop disk in each compartment, the pockets of the disks being arranged to consecutively register with the respective discharge openings in said compartments, and means for revolving said disks independently or collectively.

4. In a planter, a seed drop box divided into compartments, each compartment having a separate seed delivery opening, a seed delivery chute common to both of said openings, a rotatable seed drop disk in each compartment, a gear secured to each of the said disks, the teeth of the gear on one disk being at a greater elevation than the teeth on the gear of the opposing disk, a drive shaft, a pinion driven from the drive shaft, and means for raising and lowering the pinion to bring it in engagement with one or the other of the disk gears or in engagement with both of said gears.

5. In a planter, a seed drop box divided into compartments, each compartment having a separate seed delivery opening, a seed delivery chute common to both of said openings, a rotatable seed drop disk in each compartment, a gear secured to each of the said disks, the teeth of the gear on one disk being at a greater elevation than the teeth on the gear of the opposing disk, a drive shaft, a pinion driven from the drive shaft, and means for raising and lowering the pinion to bring it in engagement with one or the other of the disk gears or in engagement with both of said gears, a false bottom for each compartment located over the disk therein, each of the said false bottoms being provided with a seed exit opening arranged correspondingly to and over the seed pockets in the disks, and spring fingers extending down from the opening in the false bottom, the said fingers projecting into both of the pockets in the disks as said disks are revolved.

6. In a planter, a seed drop box divided into compartments, each compartment having a separate seed delivery opening, a seed delivery chute common to both of said openings, a rotatable seed drop disk in each compartment, each drop disk being provided with annularly arranged pockets, and a groove in its upper face within which groove the pockets are located, means for driving either disk separately or both disks collectively, a false bottom for each compartment, each false bottom having an opening for the exit of the seed, registering with and being over the groove in the seed drop disk that it covers, and spring fingers extending down from the said false bottoms, which fingers enter the grooves in the said disks.

7. In a planter, a seed drop box divided into compartments, each compartment having a separate seed delivery opening, a seed delivery chute common to both of said openings, a rotatable seed drop disk in each compartment, each drop disk being provided with annularly arranged pockets, and a groove in its upper face within which groove the pockets are located, means for driving either disk separately or both disks collectively, a false bottom for each compartment, each false bottom having an opening for the exit of the seed, registering with and being over the groove in the seed drop disk that it covers, spring fingers extending down from the said false bottoms, which fingers enter the grooves in the said disk, and pivoted leveling devices also carried by the false bottoms and adapted to enter the said grooves in the disks and as the pockets in the disk pass beneath it, to force surplus seed therefrom.

8. In a planter, the combination with a seed box divided into compartments, each compartment being provided with an independent discharge opening, a chute common to both discharge openings, a seed drop disk mounted to revolve in each compartment, each seed drop disk being provided with an annular groove in its upper face, pockets in said grooves, each pocket having an end wall downwardly inclined, and means for driving either disk separately or both disks collectively, of a false bottom located over each seed drop disk, each false bottom consisting of a central dome shaped section and an upwardly flaring outer section, the two sections being separated by an annular opening, which openings register with the grooves in the said disks, bridge brackets crossing the openings in the said false bottoms, connecting the two sections, spring fingers extending down from the said bridge brackets into the grooves of the disks, and gravity clearing devices carried by the said bridge brackets and adapted as the disks revolve to insure the proper quantity of seed only, entering the said pockets.

9. In a planter, the combination with a seed drop box divided into compartments, each compartment being provided with an independent opening, a chute common to both of the said discharge openings, a check row shaft, a trip wheel carried by the check row shaft, a gate for the said chute, and a controlling finger for the said gate, operated by the said trip wheel, of a seed drop disk mounted to revolve in each compartment of the seed drop boxes, each seed drop disk being provided with an annular groove in its upper face and pockets in said grooves, a gear secured to each of the said disks, the teeth of one gear being at a greater distance from the bottom of the seed boxes than the teeth of the opposing gear, a pinion adapted to mesh with the said gears, means for raising and lowering the pinion to engage with the gear of either disk or the gears of both disks, a drive shaft, and a driving connection between the drive shaft and the said pinion.

10. In a planter, the combination with a seed drop box divided into compartments, each compartment being provided with an independent opening, a chute common to both of the said discharge openings, a check row shaft, a trip wheel carried by the check row shaft, a gate for the said chute, and a controlling finger for the said gate, operated by the said trip wheel, of a seed drop disk mounted to revolve in each compartment of the seed drop boxes, each seed drop disk being provided with an annular groove in its upper face and pockets in said grooves, a gear secured to each of the said disks, the teeth of one gear being at a greater distance from the bottom of the seed boxes than the teeth of the opposing gear, a pinion adapted to mesh with the said gears, means for raising and lowering the pinion to engage with the gear of either disk or the gears of both disks, a drive shaft, and a driving connection between the drive shaft and the said pinion, a lever adapted to be operated by the operator of the machine, a crank shaft carried by the said lever, a ratchet wheel secured on the check row shaft, a rod pivoted to the lever shaft, and a dog carried by the said rod for
5 engagement with the said ratchet wheel, whereby to turn the check row shaft at the option of the operator.

In testimony whereof I have signed my name to this specification in the presence of two subscribing witnesses.

WILLIAM B. HAMPTON.

Witnesses:
 P. S. TACKETT,
 J. W. BOCKMON.